United States Patent [19]

Alber et al.

[11] Patent Number: 5,090,082

[45] Date of Patent: Feb. 25, 1992

[54] WINDSHIELD WIPING DEVICE FOR SWIVELLING WINDSHIELD OF MOTOR VEHICLES

[75] Inventors: Paul Alber, Vaihingen-Aurich; Reinhard Edele, Bietigheim-Bissingen; Klaus Hauk, Altrip; Michael Teich; Michael Schutze, both of Mannheim, all of Fed. Rep. of Germany

[73] Assignee: SWF Auto-Electric GmbH, Bietigheim-Bissingen, Fed. Rep. of Germany

[21] Appl. No.: 423,079

[22] Filed: Oct. 18, 1989

[30] Foreign Application Priority Data

Oct. 22, 1988 [DE] Fed. Rep. of Germany ....... 3836031

[51] Int. Cl.⁵ ............................................... B60S 1/04
[52] U.S. Cl. ............................ 15/250.17; 15/250.12; 15/250.00 R; 318/DIG. 2; 296/84.1; 307/10.1
[58] Field of Search .......... 15/250.10, 250.16, 250.17, 15/250.19, 250.12, 250.34, 250.35, 250 R; 296/84.1, 92, 96.2; 318/DIG. 2, 445, 446, 466, 489; 307/9.1, 10.1

[56] References Cited

U.S. PATENT DOCUMENTS

| | | | |
|---|---|---|---|
| 4,007,958 | 2/1977 | Peifer et al. | 15/250 R |
| 4,336,482 | 6/1982 | Goertler | 15/250.12 |
| 4,765,017 | 8/1988 | Berger et al. | 15/250.34 |

FOREIGN PATENT DOCUMENTS

| | | | |
|---|---|---|---|
| 0065913 | 1/1982 | European Pat. Off. | |
| 734423 | 1/1943 | Fed. Rep. of Germany | 15/250.16 |
| 2503030 | 8/1976 | Fed. Rep. of Germany | |
| 2939485 | 5/1980 | Fed. Rep. of Germany | 296/96.2 |
| 618414 | 3/1927 | France | 15/250.16 |

Primary Examiner—Harvey C. Hornsby
Assistant Examiner—Gary K. Graham
Attorney, Agent, or Firm—Robert P. Seitter; J. Gordon Lewis

[57] ABSTRACT

A windshield wiping device for swivelling windshields of motor vehicles. The device includes a wiper shaft, which is supported on the assembly adjacent to the swivel axis of the windshield, and a wiper arm projecting over the windshield. The arm includes an attachment part, by means of which it is attached to the wiper shaft, and a pivoting part which can be swivelled relative to the attachment part around a swivelling axis, and which, by means of an electrical motor is brought into a stopping position on the windshield, in which the electrical motor is independently switched off by means of a stopping position switch. In order to open the windshield without damage, in the stopping position, the swivelling axis, between the attachment part and the pivoting part of the wiper arm, is directed at least approximately in parallel to the swivelling axis of the windshield.

11 Claims, 4 Drawing Sheets

# WINDSHIELD WIPING DEVICE FOR SWIVELLING WINDSHIELD OF MOTOR VEHICLES

INTRODUCTION

This invention relates to a windshield wiping device for swivelling windshields of motor vehicles including a wiper shaft having a wiper arm attached thereto. The axis between the pivoting part of the wiper arm and its attachment part is approximately parallel to the swivelling axis of the windshield.

BACKGROUND OF THE INVENTION

Most construction machine vehicles including agricultural and forestry tractors are equipped with operator cabins. For the ventilation of the cabins, in many models a windshield, particularly the front windshield, can be swivelled around a horizontal axis. In such vehicles, measures must be taken that components of the windshield wiping device, which is coordinated with the swivelling windshield, do not impede the swivelling function of the windshield.

A windshield wiping device for a swivelling windshield of a tractor is known in which, during operation, a wiping blade supported by a wiper arm is moved back and forth within the swivelling windshield between two reverse positions. If the windshield wiping device is switched off, then the wiper blade is brought into a stopping position outside of the wiping field and outside the windshield, in which neither the wiper blade nor the wiper arm can impede the swivelling of the windshield. The additional swivelling angle into the stopping position positioned outside the wiping field is achieved at considerable mechanical and electrical expense. In order not to damage the wiper blade, when moving out over the edge of the windshield, a guide device is provided in the known device which removes the wiper arm and the wiper blade from the windshield, if these members are brought into the stopping position.

It is an object of the invention to provide a windshield wiping device in such a manner that the windshield of the vehicle can be swivelled, without disturbing components of the windshield wiping device, or the danger of damage to the windshield.

SUMMARY OF THE INVENTION

In accordance with the present invention, this object is achieved by means of a windshield wiping device in which, in the stopping position, the swivel axis proceeds between the attachment part and the pivoting part of the wiper arm, at least approximately in parallel to the swivel axis of the windshield. Thorough this coordination of both swivelling axes with one another, the pivoting part of the wiper arm and the wiper blade easily can be pivoted with the windshield. The inclination of the wiper blade to the windshield thereby remains at least approximately unchanged, so that no danger exists that the windshield can be scratched by the wiper blade.

Frequently, a wiping field is desired, which is completely symmetrical to a vertical plane proceeding perpendicularly to the swivel axis of the windshield. With parallel swivelling axes of the windshield and of the wiper arm pivoting part, it is possible to obtain such a wiping field, through the fact that the pivoting part, particularly a wiping bar belonging to the pivoting part, is curved out from a plane proceeding vertically to the swivelling axis between the attachment part and the pivoting part. Since, however, such a wiper arm is complicated to produce and is therefore relatively expensive, a construction in accordance with further embodiments is preferred.

In those embodiments, the wiping arm has a first stopping position on the edge of the wiping field, in which it can be placed independently upon the termination of the wiping operation, and a second stopping position is within the wiping field, in which the swivel axis between the attachment part and the pivoting part of the wiping arm proceeds at least approximately in parallel t the swivelling axis of the windshield, and can be moved into the wiper arm by the drive motor after the activation of a switching device. The wiper arm lying within the wiping field in the second stopping position does not disturb the vehicle operator, since the wiper arm should only occupy this stopping position if the windshield is swivelled when opening the operator's cabin.

It is advantageous to provide a switching device, which is activated by the vehicle operator if swivelling of the windshield is desired and the wiper arm and the wiper blade are t be moved into the second stopping position. If the vehicle operator, however, should forget to activate the switching device, then, upon the swivelling of the windshield, components of the windshield wiping device could be damaged. It is therefore advantageous if the switching device in accordance with the present invention is operated mechanically during the swivelling of the windshield. Both stopping positions are obtained in a simple manner through in that the electrical motor can be switched off in the first stopping position, by means of a first stopping position switch, and, in the second stopping position, by means of a second stopping position switch. A circuit, such as is known from DE-PS 25 03 030, can be utilized, and no modifications to the gearing, such as, for example, the shortening of a crank, are necessary.

It can be assumed that the windshield of the operator's cabin is only opened if it is not raining, and the windshield is dry when the windshield is open. It is then sufficient if the electrical motor, in the second stopping position, is only turned off through the switching off of the control potential without short-circuit braking. In the case of a dry windshield, the friction between the windshield and wiper blade is great enough that the electrical motor only turns slowly and, directly after being switched off, also remains stationary even without short-circuit braking. For the second stopping position switch, only one single additional contact is then necessary. Since no load currents flow in the braking current of the electrical motor, the braking potential in accordance with the present invention can be switched directly by means of the switching device. This can, nevertheless, be an economical switch, which is only designed for control currents, for example, the requirements of an electrical relay.

In accordance with a preferred embodiment, the wiper arm is straight and, in the second stopping position, is positioned at least approximately in the center of the wiping field. It is then possible, by means of a simply constructed wiper arm, to obtain a wiping field which is symmetrical relative to a vertical plane proceeding perpendicularly to the swivel axis of the windshield, and which yields a large, cleaned surface of the windshield.

BRIEF DESCRIPTION OF THE DRAWING

Two embodiments of a windshield wiping device in accordance with the present invention are depicted in the diagrams of the drawing. The invention will now be described in greater detail in the following detailed description when taken in conjunction with the accompanying drawing, in which.

DETAILED DESCRIPTION

Figure 1:
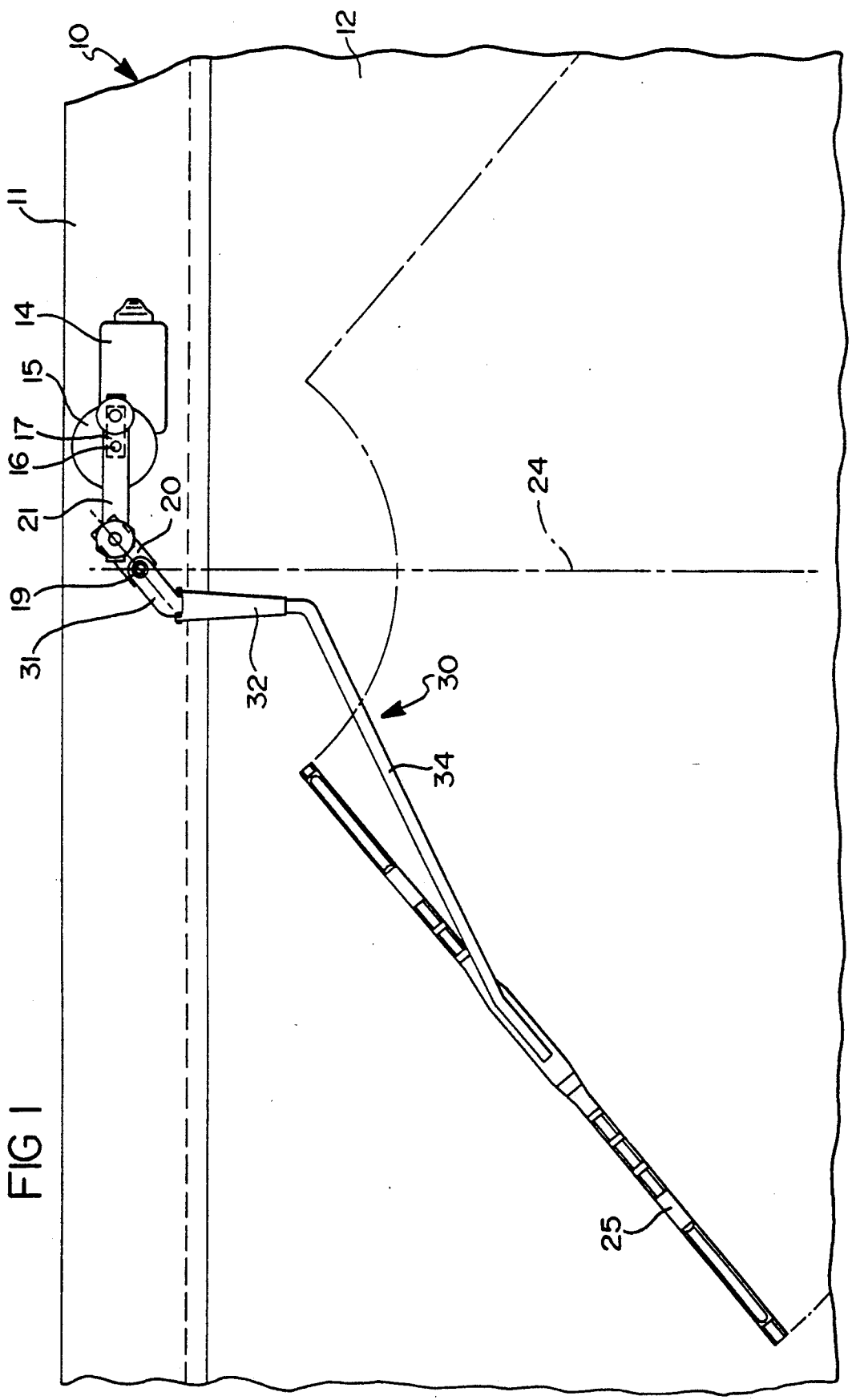
FIG. 1 is a frontal view of an operator's cabin with a swivelling windshield and a first construction of a windshield wiping device in accordance with the present invention, in which the wiper arm has only one stopping position.
Figure 2:
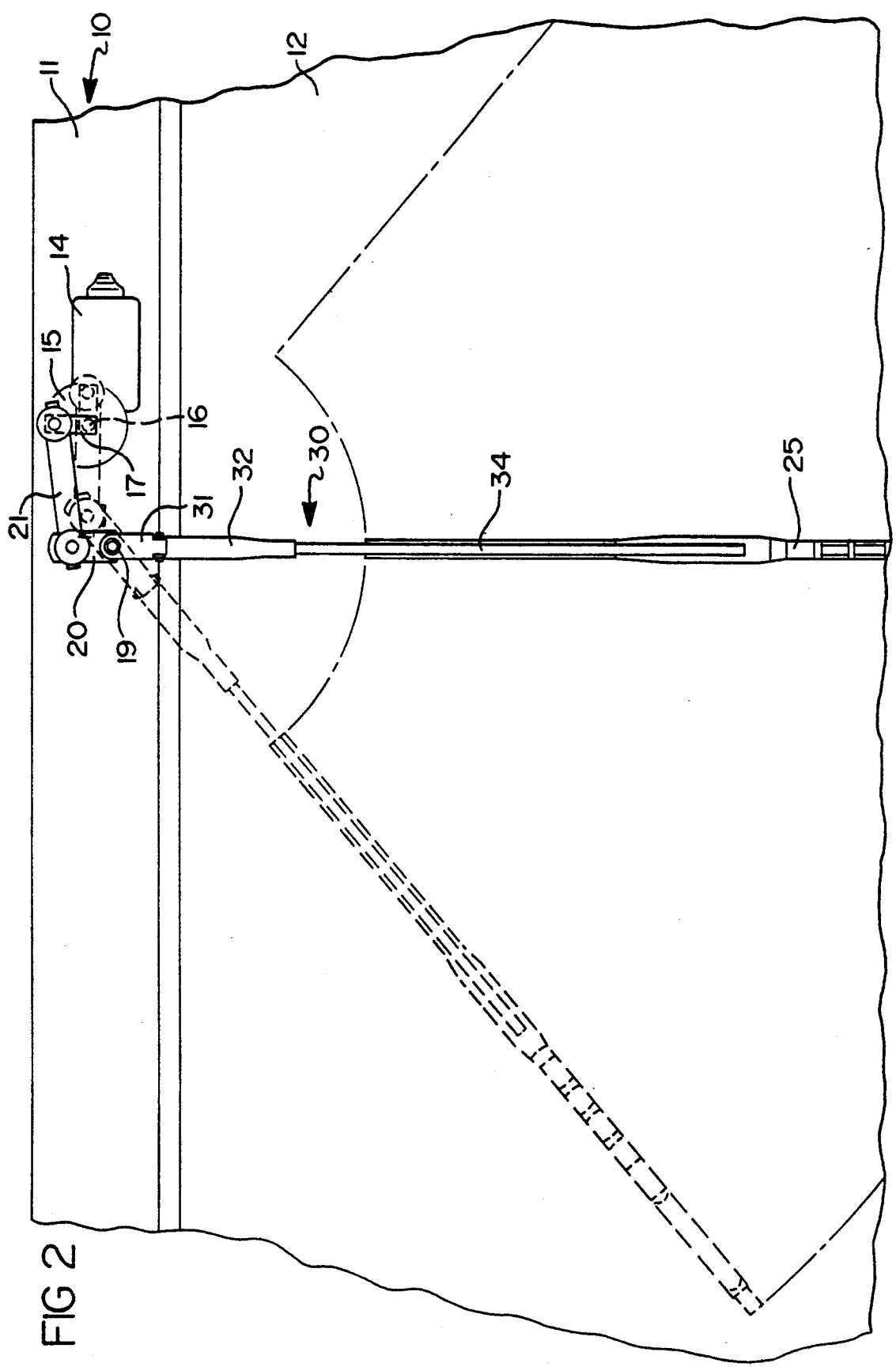
FIG. 2 is a frontal view of an operator's cabin with a second construction of a windshield wiping device in accordance with the present invention, with two stopping positions of the wiper arm.
Figure 3:
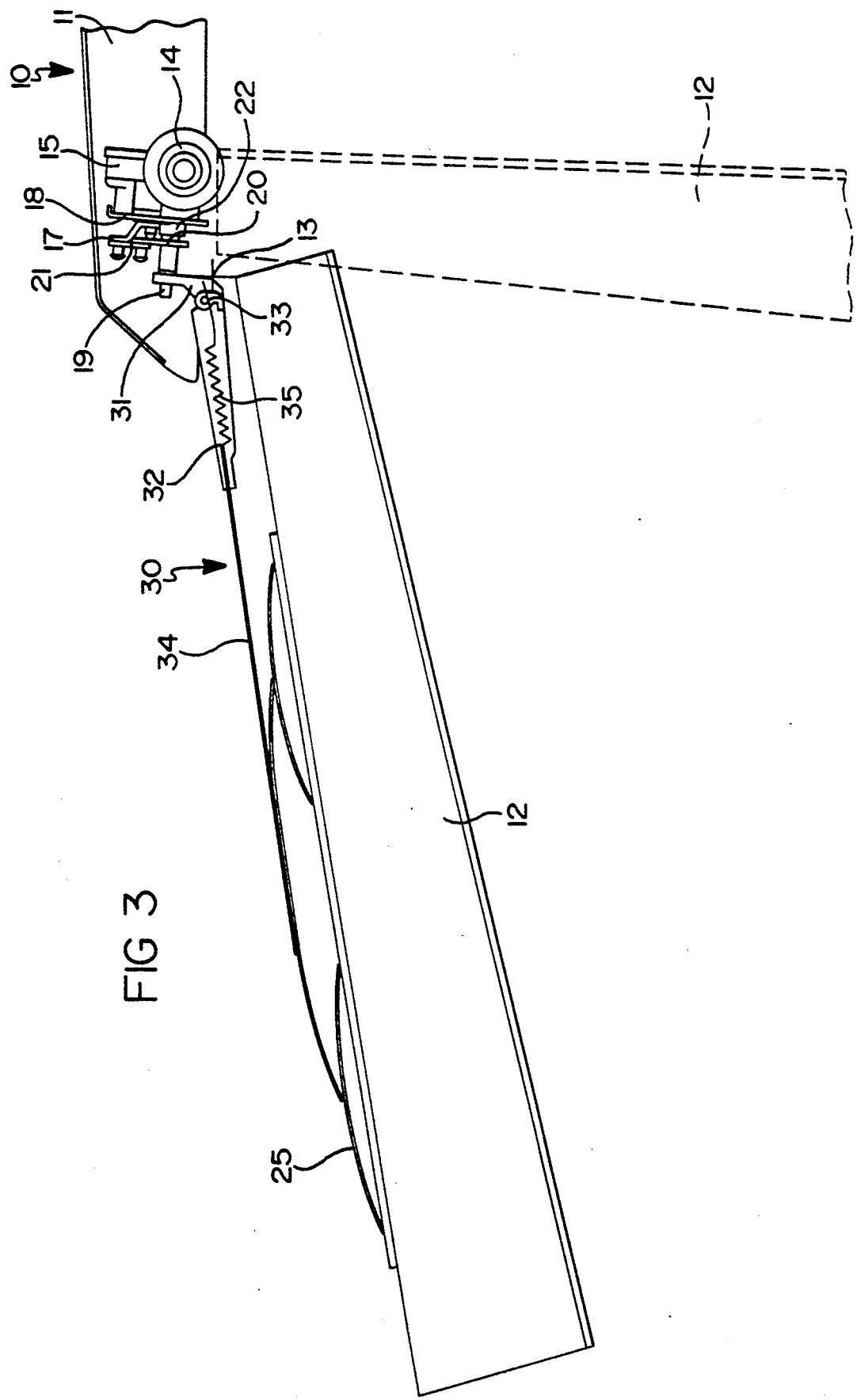
FIG. 3 is a lateral view of the operator's cabin in FIGS. 1 and 2.

In FIGS. 1 to 3, an operator's cabin (10) of a tractor, which has a roof (11) and front windshield (12), are illustrated. The front windshield (12) can be swivelled forward and upwardly around an axis (13) proceeding horizontally slightly below the roof (11), which axis is marked by a cross in FIG. 3.

A windshield wiping assembly in which an electrical motor (14) is provided, is built into the roof (11) of the operator's cabin (10). The motor shaft (16) projects out from a gear casing (15) of the electrical motor (14), in which, in the known manner, a worm gearing is accommodated. A motor crank (17), which is moved in a rotating manner, is attached in a manner which is secure against turning The electrical motor (14) is mounted on a support plate (18), on which a bearing bush (22) for a wiper shaft (19) is also attached, which is at a distance from the motor shaft (16) and is positioned parallel thereto. A sliding block (20) is articulated with the wiper shaft in a manner which is secure against turning. A connecting bar (21) is linked with both the motor crank (17) and with the sliding block (20). During operation, the wiper shaft (19) is therefore driven in a back-and-forth manner by means of the rotating motor crank (17), the connecting bar (21) and the sliding block (20).

The wiper shaft (19) lies in a plane proceeding perpendicular to the swivelling axis (13) of the front windshield (12), and proceeding centrally through the front windshield (12). On the windshield (12), a sector-like wiping field, which lies in approximately equal portions on both sides of a central plane (24), is passed over by a wiper blade (25). The wiper blade (25) is supported in an articulated manner on the free end of a wiper arm (30) and has an attachment part (31), by means of which it is attached in a manner secure against turning with the wiper shaft (19).

A U-shaped pivoting part (32) is also attached, which, since it can be swivelled around an axis (33), is articulated on the attachment part (31). A wiping bar (34) is also attached, which, on its one end, is encircled by the pivoting part (32) and, on its other end, supports the wiper blade (25). There is positioned, in the pivoting part (32), a helical spring (35), which is hinged with the wiper bar (34), and thereby, indirectly, with the pivoting part (32), while the attachment part (31) draws the pivoting part against the front windshield (12), thereby producing a pressure of the wiper blade against the windshield.

It should be provided that the front windshield (12) can be turned upwardly, despite the presence of the wiper arm (30) and the wiper blade (25), without its being damaged as a result. This is achieved, in accordance with the present invention, in that the windshield wiping devices depicted have a stopping position of the wiper arm, in which the axis (33) of the articulation, between the attachment part (31) and the pivoting part (32), proceeds parallel to the swivel axis (13) of the front windshield (12). In the depiction in accordance with FIG. 3, both axes proceed perpendicularly to the plane of representation. Through the parallel nature of both the axes, the pivoting part (32) and the wiper bar (34) of the wiper arm (30), and the wiper blade (25) can, during the upward swivelling of the windshield (12), swivel slightly. Through this means, those members continuously maintain their positions relative to the windshield, so that scratching of the windshield is prevented.

In the embodiment illustrated in FIG. 1, the wiper arm (30) and the wiper blade (25) have only one stopping position, which lies at the edge of the wiping field and coincides with a position in which, during operation, the direction of motion of the wiper blade reverses. The attachment part (31) and the pivoting part (32) could lie in the central plane (24), if the wiper arm (30) is located in the stopping position. Then, however, they would project, into the other reverse position of the wiper blade (25), far into the roof (11), where generally there is no space available. Therefore, in the embodiment in accordance with FIG. 1, the attachment part is curved, so that, in the stopping position of the wiper arm (30), and proceeding from the wiper shaft (19), it first proceeds at an angle to the central plane (24), but then, however, curves off into a plane parallel to the central plane, so that the pivoting part (32) proceeds parallel to the plane (24) and the axis (33) between the attachment part (31) and the pivoting part (32) of the wiper arm (30) proceeds in parallel to the swivelling axis (13) of the windshield (12). The curve in the attachment part (31) is again compensated for by means of a curve in the wiper bar (34) of the wiper arm (30).

Figure 4:
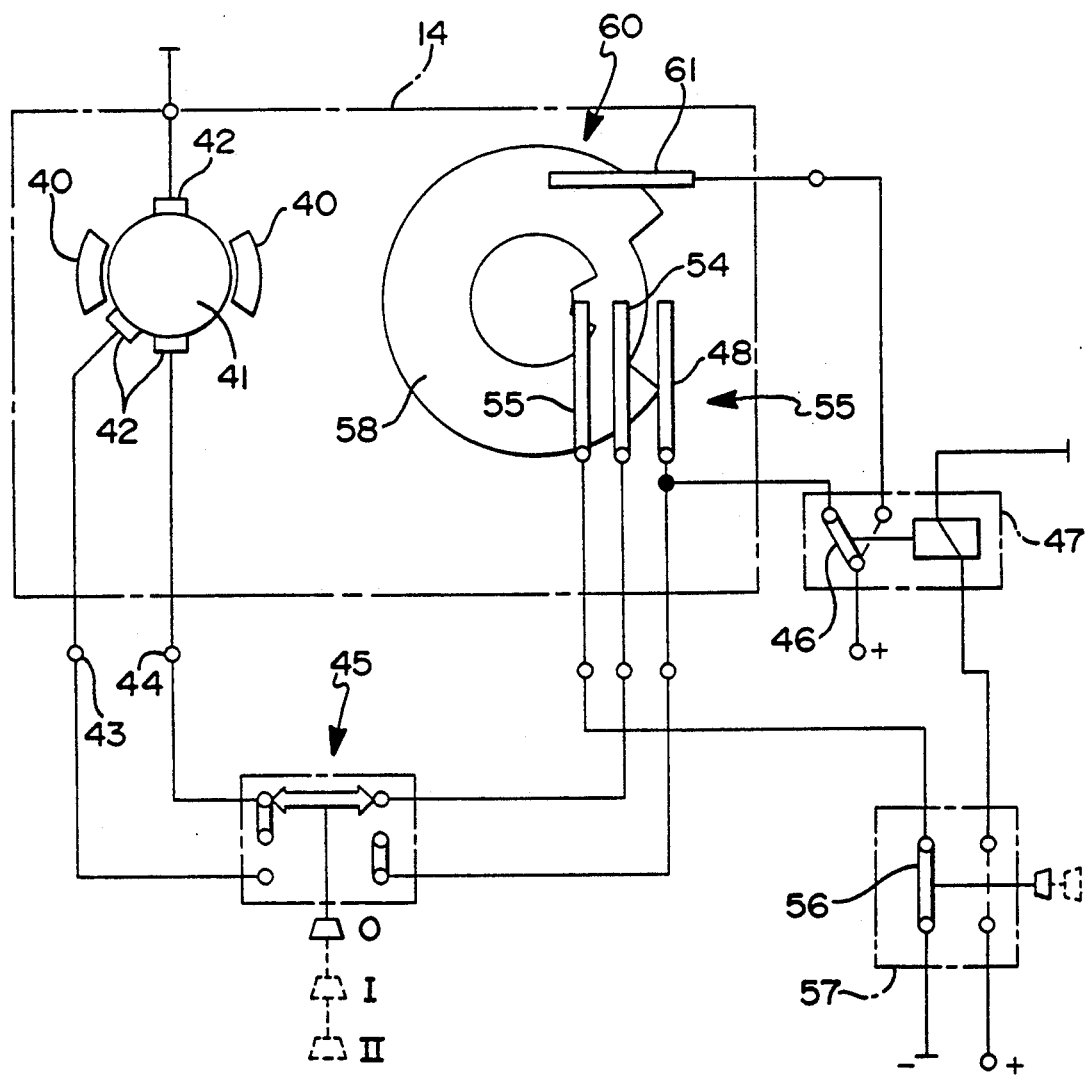
FIG. 4 is a circuitry layout for a windshield wiping device with two stopping positions of the wiper arm.

In the construction in accordance with FIGS. 2 to 4, the wiper arm (30)——the attachment part (31), pivoting part (32) and wiper bar (34) of which are now positioned in a straight line——has two stopping positions, of which, in FIG. 2, one is illustrated as a continuous line, and one is illustrated as a dotted line. The latter is the normal stopping position on the edge of the wiping field, which the wiper arm (30) occupies, when the windshield (12) is closed, after the device is switched off. In the other stopping position, which is located in the center of the wiping field, the wiper arm (30) is then moved by the electrical motor (14), if the windshield (12) is moved upwardly. In this additional stopping position, the axis (33) proceeds between the attachment part (31) and the pivoting part (32) of the wiper arm (30) in parallel to the swivelling axis (13) of the windshield (12). As is the case in the embodiment of FIG. 1, therefore, the windshield (12) can now be moved upwardly with the components of the wiper arm and with the wiper blade, as is depicted in FIG. 3.

FIG. 4 depicts the circuitry corresponding to the device in accordance with FIGS. 2 and 3. The electrical motor, which is designated by reference figure (14), is a permanent magnetic motor with two permanent magnets (40) and with an armature (41). The motor can be operated at two different speeds and has, for this purpose, three carbon brushes (42) engaging against a commutator. Both the inlets (43 and 44) of the electrical motor (14), which leads to two brushes (42) are connected with two outlets of a wiping switch (45). The switch (45) can be moved out of the neutral position "O" into two operating switching positions "I" and "II", whereby the positive potential is conveyed either to the inlet (43) or the inlet (44) of the motor (14). The positive potential thereby reaches, through a change-over contact (46) of a relay (47) one of the two inlets of the wiper switch (45).

In the position of the change-over contact (46), at which, at the said inlet of the wiper switch, the positive potential is applied, positive potential is thereby applied to a brush spring (48), which corresponds to a first stopping position switch (50), which is coordinated with the stopping position of the wiper arm (30) depicted in dotted lines in FIG. 2. Further corresponding to this stopping position switch (50) is a second brush spring (54), which is connected with the other inlet of the wiper switch (45); a third brush spring (55), which, by means of a switch contact (56) of an electrical switch (57) which is constructed as an opener and closer, can be connected to a ground; and a switching disk (58), which turns with the motor shaft, on which brush springs (48, 54, and 55) are supported, and which connects, in an electrically conductive manner, the brush springs (54) in an alternatingly manner with the brush spring (48) or the brush spring (55).

At the stopping position of the wiper arm (30), which is depicted by a continuous line in FIG. 2, there is a second stopping position switch (60), to which a fourth brush spring (61) is assigned, which lies on the same circular track as the brush spring (48), but is displaced, however, 90 degrees relative to this spring. The brush spring (61) is, in the second position of the change-over contact (46) of the relay (47), connected with positive potential. Corresponding to the stopping position switch (60), in addition to the brush spring (61), are the brush spring (54) and the switching disk (58). The brush spring (54) and the switching disc (58) are therefore components of both stopping position switches.

The electrical switch (57) is automatically activated through the opening and closing of the windshield (12) of the operator's cabin (10). The switch contact (56) occupies the position designated in FIG. 4, if the windshield is closed. During the opening of the windshield (12), the contact (56) switches positive potential through to the relay (47), so that the switching contact (46) is changed from the position depicted into the position depicted in dotted lines.

In FIG. 4, the switching contacts and the switching disk (58) occupy positions corresponding to a closed windshield (12) and a switched-off windshield wiping device. If the wiper switch (45) is now activated, and brought into the first or second operating position, then the electrical motor (14) is triggered in the usual manner and, after the switching off of the wiper switch (45), it is brought into the stopping position by means of the stopping position switch, in which the wiper arm (30) occupies the position depicted in dotted lines in FIG. 2.

If the windshield (12) is opened, then the switching contact (56) of the switch (57) is brought into the position depicted in dotted lines, so that the relay (47) is drawn and, through the switching contact (46), conveys positive potential to the brush spring (61) of the second stopping position switch (60). The brush spring (55) is, by means of the switch (57), separated from the ground, so that no short-circuiting arises The positive potential is, by means of the switching disk (58), the brush spring (54) and the wiper switch (45) located in its neutral position "O", placed against the one carbon brush of the electrical motor (14). This begins to turn, until the brush spring (61) reaches into the gap of the switching disk (58). At this point, the electrical motor is switched off. A short-circuit braking is not carried out, since the windshield (12) is open, particularly during dry weather, and the wiper blade then moves only slowly over the windshield. The wiper arm is now located in the position depicted in FIG. 2 by continuous lines, in which the axis (33) between attachment part (31) and the pivoting part (32) proceeds in parallel to the swivel axis (13) of the windshield (12), and in which the windshield (12) can easily be completely opened again. During the closing of the windshield, the wiper arm is again brought into the other stopping position.

What is claimed is:

1. A windshield wiping device adapted for use with motor vehicle windshields mounted for swiveling about a windshield axis, said device comprising:

a wiper shaft disposed adjacent said axis;

a wiper arm projecting over the windshield and including an attachment part carried by the wiper shaft and a windshield engaging pivoting part hinged to said attachment part for limited swiveling with respect thereto about a pivot axis;

means drivingly engaging said wiper shaft and energizable for reciprocating displacement of said wiper arm to define a wiping field on said windshield; and control means in-circuit with said driving means responsive to the angular position of said windshield, said control means including first switch means operable to selectively deenergize said driving means to park said wiper arm in a first predetermined stopping position at an edge of said wiping field and second switch means operative upon displacement of said windshield from a deployed orientation to disable operation of said first switch means and to park said wiper arm in a second predetermined stopping position within said wiping field wherein in said second stopping position said windshield axis is generally parallel to said pivot axis thereby allowing said windshield and said wiper arm to swivel simultaneously.

2. A windshield wiping device adapted for use with motor vehicle windshields mounted for swiveling about a windshield axis, said device comprising:

a wiper shaft disposed adjacent said axis;

a wiper arm projecting over the windshield and including an attachment part carried by the wiper shaft and a windshield engaging pivoting part hinged to said attachment part for limited swiveling with respect thereto about a pivot axis;

means drivingly engaging said wiper shaft and energizable for reciprocating displacement of said wiper arm to define a wiping field on said windshield; and control means in-circuit with said driving means operable to park said wiper arm in a first predetermined stopping position at an edge of said wiping field in a first mode of operation and operative to park said wiper arm in a second predetermined stopping position within said wiping field in a second mode of operation wherein in said second stopping position said windshield swivel axis is generally parallel to said pivot axis thereby allowing said windshield and said wiper arm to swivel simultaneously, said control means transitioning between said first and second modes of operation as a function of windshield angular position about said windshield axis.

3. The windshield wiping device of claim 2, wherein said control means is windshield position responsive to switch from said first mode of operation when said windshield is in a deployed orientation to said second mode of operation when said windshield is displaced from said deployed orientation.

4. A windshield wiping device for swivelable windshields comprising: a wiper shaft supported on an assembly adjacent a swiveling axis of the windshield; a wiper arm projecting over the windshield including an attachment part carried by the wiper shaft and a windshield engaging pivoting part carried by the attachment part and swivelable with respect thereto about a pivot axis; and an electrical motor drivingly engaging said wiper shaft, said motor in-circuit with a controller including switch means operable to effect reciprocating displacement of said wiper arm to define a wiping field on said windshield and to selectively park said wiper arm in a first predetermined stopping position at the edge of a wiping field in which the electrical motor is independently denergized by a stopping position switch, said motor and controller further operative to reposition and park the wiper arm in a second predetermined stopping position within the wiping field in which second position the pivot axis between the attachment part and the pivoting part of the wiper arm is at least approximately in parallel relationship to the swiveling axis of the windshield thereby allowing said windshield and said wiper arm to swivel simultaneously and into which the wiper arm is moved after the activation of a switching device in response to displacement of said windshield from a deployed position.

5. The windshield wiping device in accordance with claim 4, wherein the electrical motor can be energized for wiping operation by an operating switch wherein the wiper arm is only moved into the second stopping position by the drive motor while in a neutral position of the operating switch.

6. The windshield wiping device in accordance with claim 5, wherein the switching device is operated mechanically during the swivelling of the windshield.

7. The windshield wiping device in accordance with claim 6, wherein the electrical motor, in the first predetermined stopping position, is switched off by means of a first stopping position switch, and, in the second predetermined stopping position, by means of a second stopping position switch.

8. The windshield wiping device in accordance with claim 7, wherein the electrical motor is, in the second predetermined stopping position, only switched off by switching of electrical control potential in absence of short-circuit braking.

9. The windshield wiping device in accordance with claim 8, wherein the control potential and a stopping potential are switched off by two contacts of the first stopping position switch through the activation of the switching device and the control potential solely is placed onto a contact of the second stopping position switch.

10. The windshield wiping device in accordance with claim 9, wherein the stopping potential is controlled directly by means of the switching device.

11. The windshield wiping device in accordance with claim 4, wherein the wiper arm is substantially straight, and is located, in the second predetermined stopping position, at least approximately in the center of the wiping field.

* * * * *